United States Patent [19]
Srinivasan et al.

[11] Patent Number: 5,994,462
[45] Date of Patent: Nov. 30, 1999

[54] SOLID COATING COMPOSITIONS FOR POWDER AND EXTRUSION APPLICATIONS

[75] Inventors: K. G. Srinivasan, Oak Park; Stephen Postle, Lindenhurst, both of Ill.; Hans Widmer, Wolfhausen-Bubikou, Switzerland

[73] Assignee: The Dexter Corporation, Windsor Locks, Conn.

[21] Appl. No.: 09/095,856

[22] Filed: Jun. 11, 1998

[51] Int. Cl.$^6$ ............................................ C08G 59/00
[52] U.S. Cl. ............................ 525/65; 427/386; 525/438
[58] Field of Search ................... 525/65, 438; 427/386

[56] References Cited

U.S. PATENT DOCUMENTS

| H1667 | 7/1997 | Poincloux et al. | 525/438 |
|---|---|---|---|
| 4,012,363 | 3/1977 | Brüning et al. | 260/75 R |
| 5,397,641 | 3/1995 | Moens et al. | 428/357 |
| 5,407,702 | 4/1995 | Smith et al. | 427/211 |

FOREIGN PATENT DOCUMENTS

| 2096643 | 6/1992 | Canada . |
|---|---|---|
| 0 067 060 | 3/1986 | European Pat. Off. . |
| 2516897 | 10/1975 | Germany . |
| 59-105056 | 6/1984 | Japan . |
| 03267137 | 11/1991 | Japan . |
| 1532640 | 11/1978 | United Kingdom . |
| WO 94/01224 | 1/1994 | WIPO . |

OTHER PUBLICATIONS

Stevens, "Cure kinetics of a low epoxide/hydroxyl group-ratio bisphenol A epoxy resin–anhydride system by infrared absorption spectroscopy," *Journal of Applied Polymer Science,* vol. 26, 4259–4278 (1981).

Matêjka et al., "Curing epoxy resins with anhydrides. Model reactions and reaction mechanism," *Journal of Polymer Science: Polymer Chemistry Edition, vol. 21,* 2873–2885 (1983).

*Primary Examiner*—Erma Cameron
*Attorney, Agent, or Firm*—Marshall, O'Toole, Gerstein, Murray & Borun

[57] ABSTRACT

A solid coating composition for use in powder coating and extrusion coating applications is disclosed. The coating composition contains about 70 to about 95% of a base resin, such as a polyester, and about 1 to about 50% of a low-to-medium molecular weight end-capped epoxy resin, and is essentially free of a bisphenol-A diglycidyl ether monomer. The solid coating composition is applied to a metal substrate in a powder coating or an extrusion process to provide a metal article having a composition film having a thickness of about 1 to about 200 microns. The metal articles can be used to package food and beverages.

27 Claims, No Drawings

SOLID COATING COMPOSITIONS FOR POWDER AND EXTRUSION APPLICATIONS

FIELD OF THE INVENTION

The present invention relates to solid coating compositions for metal substrates that, after application, demonstrate excellent adhesion, weatherability, barrier properties, and flexibility; to a method of powder coating or extrusion coating a metal substrate; and to a metal article, such as a metal can or container, or a material of construction, like aluminum siding, having at least one surface coated with an adherent layer of the solid coating composition. A solid coating composition comprises: (a) a base polymer, such as a polyester having a weight average molecular weight of about 10,000 to about 70,000, and (b) an end-capped epoxy resin having a weight average molecular weight ($M_w$) of about 300 to about 10,000, and that is essentially free of a bisphenol diglycidyl ether monomer, like bisphenol-A diglycidyl ether (i.e., BADGE) monomer or bisphenol-F diglycidyl ether (i.e., BFDGE) monomer. The solid coating composition is applied to a metal substrate as a film having a thickness of about 1 to about 200 microns.

BACKGROUND OF THE INVENTION

It is well known that an aqueous solution in contact with an untreated metal substrate can result in corrosion of the untreated metal substrate. Therefore, a metal article, such as a metal container for a water-based product, like a food or beverage, is rendered corrosion resistant in order to retard or eliminate interactions between the water-based product and the metal article. Generally, corrosion resistance is imparted to the metal article, or to a metal substrate in general, by passivating the metal substrate, or by coating the metal substrate with a corrosion-inhibiting coating.

Investigators continually have sought improved coating compositions that reduce or eliminate corrosion of a metal article and that do not adversely affect an aqueous product packaged in the metal article. For example, investigators have sought to improve the imperviousness of the coating in order to prevent corrosion-causing ions, oxygen molecules, and water molecules from contacting and interacting with a metal substrate. Imperviousness can be improved by providing a thicker, more flexible and more adhesive coating, but often, improving one advantageous property is achieved at the expense of a second advantageous property.

In addition, practical considerations limit the thickness, adhesive properties, and flexibility of a coating applied to a metal substrate. For example, thick coatings are expensive, require a longer cure time, can be esthetically unpleasing, and can adversely affect the process of stamping and molding the coated metal substrate into a useful metal article. Similarly, the coating should be sufficiently flexible such that the continuity of the coating is not destroyed during stamping and molding of the metal substrate into the desired shape of the metal article.

Investigators also have sought coatings that possess chemical resistance in addition to corrosion inhibition. A useful coating for the interior of a metal container must be able to withstand the solvating properties of a product packaged in the metal container. If the coating does not possess sufficient chemical resistance, components of the coating can be extracted into the packaged product and adversely affect the product. Even small amounts of extracted coating components can adversely affect sensitive products, like beer, by imparting an off-taste to the product.

Conventionally, organic solvent-based coating compositions were used to provide cured coatings having excellent chemical resistance. Such solvent-based compositions include ingredients that are inherently water insoluble, and thereby effectively resist the solvating properties of water-based products packaged in the metal container. However, because of environmental and toxicological concerns, and in order to comply with increasingly strict governmental regulations, an increasing number of coating compositions are water based. The water-based coating compositions include ingredients that are water soluble or water dispersible, and, therefore, cured coatings resulting from water-based coating compositions often are more susceptible to the solvating properties of water.

In addition, water-based coating compositions do not completely overcome the environmental and toxicological problems associated with organic solvents because water-based compositions typically contain two or more pounds of organic solvent per gallon of coating composition. The organic solvent is a necessary ingredient to dissolve and disperse composition ingredients, and to improve the flow and viscosity of the composition. Therefore, in order to entirely avoid the environmental and toxicological problems associated with organic solvents, investigators have sought solid coating compositions that can be applied to a metal substrate. In attempts to find a useful solid coating composition, investigators have tested powder coatings, laminated film coatings, radiation cure coatings, and extrusion coatings.

Solid powder coatings have been used to coat a metal substrate with a coating composition. Solid coating compositions also have been extruded onto a metal substrate, for example, as disclosed in European Patent No. 0 067 060, PCT publication WO 94/01224, and Smith et al. U.S. Pat. No. 5,407,702.

In both powder coating and extrusion coating applications, an important component of the coating composition is an epoxy resin. Epoxy resins impart several properties that are important with respect to a cured coating composition on a metal substrate. However, epoxy resins also have a serious disadvantage in that residual amounts of bisphenol diglycidyl ether monomer are present in the resin, typically in an amount of about 0.5% by weight. Typical bisphenol diglycidyl ether are bisphenol-A diglycidyl ether (i.e., BADGE) and bisphenol-F diglycidyl ether (i.e., BFDGE). The term "BADGE" as used herein refers to a bisphenol-A diglycidyl ether and to other similar bisphenol diglycidyl ethers, like a bisphenol-F diglycidyl ether. Additional examples of bisphenol diglycidyl ether monomers are illustrated hereafter.

The presence of a BADGE monomer raises serious environmental and toxicological concerns, especially because a BADGE monomer can be extracted from a cured coating on the interior of a metal container by a product stored in the container. Accordingly, regulatory agencies have promulgated regulations reducing the amount of a BADGE monomer in coating compositions, and especially coating compositions used on the interior of food and beverage containers.

In order to overcome the problem of a free BADGE monomer, investigators attempted to use high molecular weight phenoxy resins as a replacement for epoxy resins. Phenoxy resins are essentially very high molecular weight epoxy resins containing very few, if any, intact epoxy rings. This attempted replacement led to other problems, such as difficulty in handling and processing the high molecular weight phenoxy resins in many practical applications, and the very high cost of the phenoxy resins. In addition, coatings containing the phenoxy resins did not provide the excellent adhesion to metal substrates that is provided by coatings containing low-to-medium molecular weight epoxy resins.

Investigators, therefore, have sought solid coating compositions for use on the exterior and interior of food and beverage containers that are free, or essentially free, of a BADGE monomer, that exhibit the advantageous properties of adhesion, flexibility, chemical resistance, and corrosion inhibition, that are economical, and do not adversely affect the taste or other esthetic properties of sensitive foods and beverages packaged in the container. Investigators especially have sought useful solid coating compositions having these desirable benefits and that reduce the environmental and toxicological concerns associated with BADGE monomer. In particular, investigators have sought solid coating compositions for food and beverage containers that (1) meet increasingly strict environmental regulations, (2) have corrosion inhibition properties at least equal to existing epoxy-based and organic solvent-based coating compositions, and (3) are easily applied onto a metal substrate, by powder coating or extrusion techniques, as a thin, uniform film. Such solid coating compositions would satisfy a long felt need in the art.

A present solid coating composition comprises: (a) a base polymer, such as a polyester or blend of polyesters, and (b) an end-capped epoxy resin having an $M_w$ about 300 to about 10,000 and that is essentially free of a BADGE monomer. A present solid coating composition is a thermoplastic composition and can be applied as a powder coating or extruded onto a metal substrate. A crosslinking step, such as an additional heating step after application of the composition onto the metal substrate or use of a crosslinking agent, is not required. A present solid coating composition is free of organic solvents, yet an applied film demonstrates excellent coating properties, such as adhesion, hardness, and flexibility.

A solid coating composition of the present invention contains no organic solvents, and, therefore, overcomes the environmental and toxicological problems associated with liquid coating compositions. In addition, a present solid coating composition also avoids the environmental and toxicological problems associated with a BADGE monomer.

The present thermoplastic solid coating compositions provide a sufficiently flexible coating such that the coated metal substrate can be deformed without destroying film continuity. In contrast, thermosetting compositions often provide a rigid cured film thereby making it difficult to impossible to coat the metal substrate prior to deforming, i.e., shaping, the metal substrate into a metal article, like a metal closure, can, can end, can tube, metal drum, or aerosol can. Coating a metal substrate prior to shaping the metal substrate is the present standard industrial practice.

As an added advantage, it is envisioned that a present solid coating composition can be used on can ends, can and drum bodies, can tubes, and closures, thereby obviating the use of different coating compositions by container manufacturers. Furthermore, a present solid coating composition exhibits sufficient clarity, hardness, and mar resistance after application for use as a coating on the exterior of a metal container. Accordingly, an extrusion coating composition of the present invention has a more universal range of applications, such as for the interior coating of a metal container for food or beverage products, or for the exterior coating of a metal container or a material of construction, like aluminum siding, and overcomes the environmental and toxicological concerns associated with epoxy resins and with a liquid coating composition.

SUMMARY OF THE INVENTION

The present invention is directed to solid coating compositions that, after application to a metal substrate by powder coating or extrusion techniques, effectively inhibit corrosion of the metal substrate, do not adversely affect products packaged in a container having an interior surface coated with the composition, exhibit excellent flexibility, barrier properties, weathering, chemical resistance, and adhesion, and avoid the environmental and toxicological problems associated with a BADGE monomer and with organic solvents. A solid coating composition of the present invention can be used on closures, can tubes, can ends, and can and drum bodies, and on container interiors and exteriors, as well as materials of construction, like aluminum siding and gutters. The solid coating compositions effectively inhibit corrosion of ferrous and nonferrous metal substrates when the composition is powder coated or extruded onto a surface of the metal substrate.

A present solid coating composition comprises: (a) a base resin, such as a thermoplastic polyester, or a blend of polyesters, having a weight average molecular weight ($M_w$) of about 10,000 to about 70,000, and (b) an end-capped epoxy resin having an $M_w$ of about 300 to about 10,000 and that is essentially free of a BADGE monomer. The composition also is free of organic solvents.

In particular, the present extrusion coating composition comprises: (a) about 70% to about 95%, by total weight of the composition, of a polyester having an $M_w$ of about 10,000 to about 70,000, and preferably about 15,000 to about 50,000, or a mixture of such polyesters, and (b) 1% to about 50%, by total weight of the composition, of an end-capped epoxy resin having an $M_w$ of about 300 to about 10,000, and preferably about 600 to about 8,000. The end-capped low-to-medium molecular weight epoxy resin is at least essentially free of BADGE monomer, and in preferred embodiments, is free of BADGE monomer. A present solid coating composition optionally can include: (c) 0% to about 50%, by total weight of the composition, of an inorganic filler, and (d) 0% to about 4%, by total weight of the composition, of a flow control agent.

A polyester included in solid coating composition is a thermoplastic polyester prepared from an acid, preferably terephthalic acid, isophthalic acid, or a mixture thereof, and an aliphatic diol. The polyester most preferably is a co-polyester containing terephthalic acid and isophthalic acid. The polyester has an acid value of 0 to about 150 mg (milligram) KOH (potassium hydroxide) /g (grams) and a hydroxyl value of 0 to about 150 mg KOH/g, a softening point of 140° C. or greater, and a glass transition temperature (Tg) of about −30° C. to about 120° C. In addition, the polyester has a melt viscosity of about 25 to about 200 Pa.s at 240° C., and a melt flow index (MFI) of about 20 to about 800 g/10 min (minutes) at 200° C. Blends, or mixtures, of polyesters also are useful in the composition and method of the present invention.

An end-capped epoxy resin included in the solid coating composition is a reaction product of a low-to-medium molecular weight epoxy resin and a compound having an active hydrogen atom, for example, an alcohol, a phenol, a carboxylic acid, or a secondary amine, a mercapton, phosphoric acid, phosphorous acid, or phosphoric acid. The epoxy resin and active hydrogen compound are reacted to a sufficient degree such that the epoxy rings are opened and the end-capped epoxy resin contains 0% to 0.025%, by weight, of a BADGE monomer.

Components (a) and (b), and (c) and (d), if present, and other optional components are heated and intimately admixed to provide a homogenous solid coating composition. After cooling, the solid coating composition is comminuted into a powder or pellets having particle size sufficient for powder coating or extrusion coating.

As used here and hereinafter, the term "solid coating composition" is defined as a coating composition including a base resin, an end-capped epoxy resin, an optional filler, an optional flow control agent, and any other optional ingredients. The term "applied coating composition" is defined as an adherent polymeric coating resulting from powder coating or extrusion coating a solid coating composition onto a metal substrate.

Therefore, one important aspect of the present invention is to provide a solid coating composition that effectively inhibits the corrosion of ferrous and nonferrous metal substrates. A solid coating composition, after powder coating or extrusion onto a metal substrate, provides an adherent barrier layer of an applied coating composition that effectively inhibits corrosion, exhibits excellent flexibility and adhesion on the metal substrate, and does not adversely affect a product, like a food or beverage, that contacts the extruded coating composition, e.g., a BADGF monomer is not present for extraction into the food or beverage.

Because of these advantageous properties, an applied coating composition can be used to coat the interior of food and beverage containers and overcome the disadvantages associated with conventional liquid compositions and with prior solid compositions containing epoxy resins. An applied coating composition comprises the base polymer and end-capped epoxy resin, and, if present, the filler and the flow control agent, essentially in the amounts these ingredients are present in the solid coating composition.

In accordance with another important aspect of the present invention, an applied coating composition demonstrates excellent flexibility and adhesion to a metal substrate. The excellent adhesion of an applied coating composition to a metal substrate improves the barrier and corrosion-inhibiting properties of the coating composition. The excellent flexibility of an applied coating composition facilitates processing of the coated metal substrate into a coated metal article, like in molding or stamping process steps, such that the cured coating composition remains in continuous and intimate contact with the metal substrate. An applied coating composition exhibits excellent chemical resistance and does not adversely affect a food or beverage packaged in a container having an interior surface coated with the cured coating composition. An applied coating composition is sufficiently hard to resist scratching.

In accordance with another important aspect of the present invention, a solid coating composition of the present invention can be extruded onto a metal substrate to provide a uniform film of an extruded coating composition having a film thickness of about 1 to about 40 microns, and preferably 2 to about 30 microns. A solid coating composition can be powder coating onto a metal substrate to provide a uniform film of a coating composition of about 1 to about 200 microns, and preferably about 10 to about 150 microns. In addition, a present solid coating composition can be used both on the interior and exterior of can bodies and can ends, thereby obviating the need for a container manufacturer to use multiple coating compositions.

Yet another important aspect of the present invention is to provide a solid coating composition that is essentially free of a BADGE monomer. This is accomplished by utilizing a low-to-medium molecular weight end-capped epoxy resin having a BADGE monomer content of 0 to about 0.025%, by weight. Accordingly, a present coating composition incorporating the end-capped epoxy resin contains 0 to about 0.0075%, of a BADGE monomer, by weight, i.e., is essentially free of a BADGE monomer. The present solid coating compositions, therefore, overcome the toxicological and environmental problems associated with a BADGE monomer, without adversely affecting the properties of the coating composition.

These and other aspects and advantages of the present invention will become apparent from the following detailed description of the preferred embodiments.

DETAILED DESCRIPTION OF THE PREFERRED EMBODIMENTS

A solid coating composition of the present invention, after application to a metal substrate, provides an applied coating composition that effectively inhibits the corrosion of metal substrates, such as, but not limited to, aluminum, iron, steel and copper. An applied coating composition also demonstrates excellent adhesion to the metal substrate, excellent chemical resistance and scratch resistance, and excellent flexibility. An applied coating composition does not impart a taste to foods or beverages that contact the applied coating composition, and the applied coating composition is essentially free of a BADGE monomer that can be extracted from the coating by the foods or beverages that contact the coating.

In general, a present solid coating composition comprises: (a) a base polymer, such as a polyester, or a mixture of polyesters, having an $M_w$ of about 10,000 to about 70,000, and (b) an end-capped epoxy resin having an $M_w$ of about 300 to about 10,000 and that is essentially free of a BADGE monomer. The solid coating composition is free of organic ganic solvents. A solid coating composition optionally can further include: (c) a filler and/or (d) a flow control agent. In addition, a present solid coating composition can include optional ingredients that improve the esthetics of the composition, that facilitate manufacture arid/or application of the composition, or that improve a functional property of the composition. The individual composition ingredients are described in more detail below.

(a) Base Polymer

A solid coating composition of the present invention includes one or more thermoplastic base polymers in a total amount of about 70% to about 95%, by total weight of the composition. Preferably, a solid coating composition includes from about 75% to about 95%, by total weight of the composition, of a base polymer. To achieve the full advantage of the present invention, a solid coating composition includes about 85% to about 95% of a base polymer, by total weight of the composition. The base polymers are high molecular weight polymers having an $M_w$ of about 10,000 up to about 200,000. As used here and hereafter, the term "base polymer" or "polyester" refers to a single base polymer or polyester or to a mixture of two or more base polymers or polyesters.

Useful base polymers possess properties that allow the base polymer to be blended with the end-capped epoxy resin and other optional composition components, to be applied onto a metal substrate, and to provide an applied coating composition having the necessary adhesion and flexibility for application to a metal substrate prior to shaping the metal substrate into a metal article. The base polymer also is sufficiently nonreactive such that, when the coating composition is melted or heated during preparation or application of the composition, the base polymer does not enter into a crosslinking reaction with the end-capped epoxy resin or other composition components.

The base polymer typically is a polyester, however, other types of polymers can be used as the base polymer of a solid coating composition. Examples of such polymers include, but are not limited to, polyesters, polyolefins, polyamides, polyacrylics, polycarbonates, polyurethanes, carboxylated polyesters, fluorocarbon resins, styrene resins, ABS (acrylonitrile-butadiene-styrene) resins, chlorinated polyethers, halogenated polyolefins, and similar resins, and blends thereof.

A preferred base polymer is a polyester or blend of polyesters. The polyesters are prepared from a dicarboxylic acid, preferably an aromatic dicarboxylic acid, and an aliphatic diol. These ingredients are interacted to provide a polyester having an $M_w$ of about 10,000 to about 70,000, preferably of about 15,000 to about 50,000, and to achieve the full advantage of the present invention, about 20,000 to about 40,000. Alternatively stated, the polyesters have a number average molecular weight ($M_n$) of about 5,000 to about 30,000. Accordingly, the polyesters are considered high molecular weight polyesters. The polyesters have an acid number of about 0 to about 150 mg KOH/g, and preferably about 5 to about 100 mg KOH/g. The polyesters have a hydroxyl number of 0 to about 150 mg KOH/g, and preferably about 5 to about 100 mg KOH/g.

A polyester suitable for use in a present solid coating composition, provides an applied coating composition having good film tensile strength, good permeation resistance, retortability, and good barrier properties. The polyester, and the solid coating composition, therefore, have a softening point of 140° C. or greater, as measured using the procedure set forth in DIN 52011. Preferably, the polyester and solid coating composition have a softening point of 120° C. to about 200° C. Above about 200° C., the polyester and solid coating composition lose flexibility, and subsequent shaping of a coated metal substrate into a metal article can cause film failure. Below 120° C., the polyester and solid coating composition is too soft to withstand the pasteurization and processing temperatures used by food packagers when packaging food in a metal container.

Similarly, the polyester has a Tg of about −30° C. to about 120° C., and preferably about 15° C. to about 100° C. To achieve the full advantage of the present invention, the polyester has a Tg of about 20° C. to about 80° C. In this Tg range, a polyester is sufficiently flexible to permit deformation of an applied coating composition without forming cracks, and is sufficiently hard to exhibit excellent chemical and mar resistance. If the Tg of the polyester is below about −30° C., an applied coating composition is too soft to provide effective chemical resistance and mar resistance. If the polyester has a Tg above about 120° C., an applied coating composition lacks sufficient flexibility. The Tg is measured using a differential scanning calorimeter by standard procedures. dures.

Useful polyesters also exhibit a melt viscosity of 25 to about 200 Pa.s, preferably about 40 to about 175 Pa.s, and more preferably about 50 to about 150 Pa.s at 240° C. The melt viscosity is measured using a cone/plate viscosimeter by the standard PIN ISO 1133 procedure. The melt flow index (MFI), as measured using DIN 53735, of a useful polyester is about 20 to about 800, preferably about 20 to about 600, and most preferably about 20 to about 200 g/10 min at 200° C.

The polyester typically is prepared by condensing a dicarboxylic acid with an aliphatic diol. To provide a polyester having optimum properties for a solid coating composition for a food or beverage container, the dicarboxylic acid preferably is an aromatic dicarboxylic acid. To achieve the full advantage of the present invention, the dicarboxylic acid comprises terephthalic acid, isopthalic acid, a naphthalene dicarboxylic acid, and mixtures thereof. Tt is also understood that an esterifiable derivative of a dicarboxylic acid, such as a dimethyl ester or anhydride of a dicarboxylic acid, can be used to prepare the polyester.

Examples of dicarboxylic acids used to prepare a polyester include aliphatic and aromatic dicarboxylic acids, such as, but not limited to, phthalic acid, isophthalic acid, terephthalic acid, 5-tert-butyl isophthalic acid, adipic acid, malonic acid, 2,6-naphthalenedicarboxylic acid, 1,5-naphthalenedicarboxylic acid, hexahydroterephthalic acid, cyclohexanedicarboxylic acid, sebacic acid, azeleic acid, succinic acid, glutaric acid, and mixtures and esterifiable derivatives thereof. Substituted aliphatic and aromatic dicarboxylic acids, such as halogen or alkyl-substituted dicarboxylic acids, also are useful. Preferably, at least 60 mol % aromatic dicarboxylic acids are used to prepare the polyester.

Nonlimiting examples of diols used to prepare a polyester include ethylene glycol, diethylene glycol, triethylene glycol, propylene glycol, dipropylene glycol, hexylene glycol, butylene glycol, neopentyl glycol, trimethylpropane diol, cyclohexane dimethanol, a polyethylene or polypropylene glycol having a molecular weight of about 500 or less, and mixtures thereof. A small amount of a triol or polyol, i.e., 0 to 3 mole of diol, can be used to provide a partially branched, as opposed to linear, polyester.

The diol and the dicarboxylic acid, in correct proportions, are interacted under standard esterification procedures to provide a polyester having the necessary $M_w$, molecular weight distribution, branching, crystallinity, and functionality for use in a present extrusion coating composition. Examples of useful polyesters can be prepared as set forth in Brunig et al. U.S. Pat. No. 4,012,363, incorporated here by reference, and in Canadian Patent No. 2,091,875.

In addition, useful polyesters are commercially available under the tradename DYNAPOL, from Hüls AG, Berlin, Germany. Examples of specific polyesters are DYNAPOL P1500, DYNAPOL P1510, and DYNAPOL P1550, each available from Hüls AG and based on terephthalic acid and/or isophthalic acid. Another useful polyester is GRII, ESTA V 79/20, available from EMS. Other useful commercial polyesters include, but are not limited to, SHELL CARIPAK P76, available from Shell Chemicals (Europe), Switzerland; SELAR PT 6129 and SELAR PT 8307, both available from DuPont Packaging and Industrial Polymers, Wilmington, DE. In preferred embodiments, the present solid coating compositions contain a mixture of polyesters, having different molecular weights, to optimize film performance and esthetics.

Especially useful polyesters include polyethylene terephthalates (PET), polybutylene terephthalates (PBT), polyethylene naphthalates (PEN), and polybutylene naphthalates (PBN), and mixtures thereof, including alloys and other intermediate compositions resulting from a mixture of polyesters.

The base polymer also can be a polyacrylic resin, such as a homopolymer or copolymer of acrylic acid, methacrylic acid, esters of acrylic acid, esters of methacrylic acid, acrylamides, and methacrylamides. In addition, a polyolefin, like a homopolymer or a copolymer of ethylene, propylene, ethylene, propylene blends, 1-butene, and 1-pentene, either functionalized or nonfunctionalized, can be used as the base polymer. Grafted polypropylene and ethylene-propylene copolymers can be used. Polyvinyl chloride includes homopolymers and copolymers, for example, with ethylene or vinyl acetate, for example. Fluorocarbon resins include tetrafluorinated polyethylene, trifluorinated monochorinated polyethylene, hexafluorinated ethylene-propylene resin, polyvinyl fluoride, and polyvinylidene fluoride, for example.

Such base polymers have an $M_w$ of about 20,000 to about 200,000, and preferably about 40,000 to about 175,000. To achieve the full advantage of the present invention, such base polymers are an $M_w$ of about 50,000 to about 150,000.

(b) End-Capped Epoxy Resin

The solid coating composition also includes about 1% to about 50%, by total weight of the composition, of an end-capped epoxy resin. Preferably, a solid coating composition contains about 5% to about 30%, and more preferably about 5% to about 25%, of the end-capped epoxy resin, by total weight of the composition. To achieve the full advantage of the present invention, the solid coating composition contains about 5% to about 20% of the end-capped epoxy resin, by total weight of the composition.

Solid coating compositions often include epoxy resins to improve adhesion of the coating to a metal substrate. The typical epoxy resin is a medium molecular weight epoxy resin, and such resins contain about 0.5% of a BADGE monomer used in the preparation of the epoxy resin. A typical epoxy resin has the structure illustrated in structural formula (I).

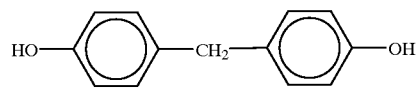

(bisphenol F)

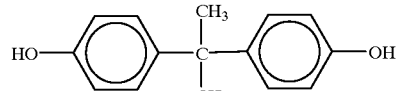

(bisphenol A)

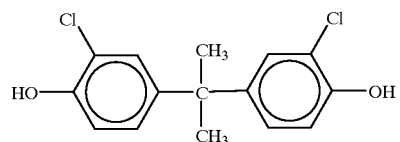

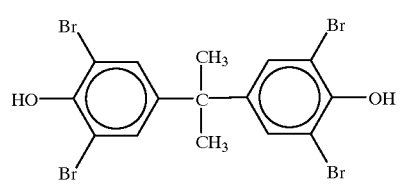

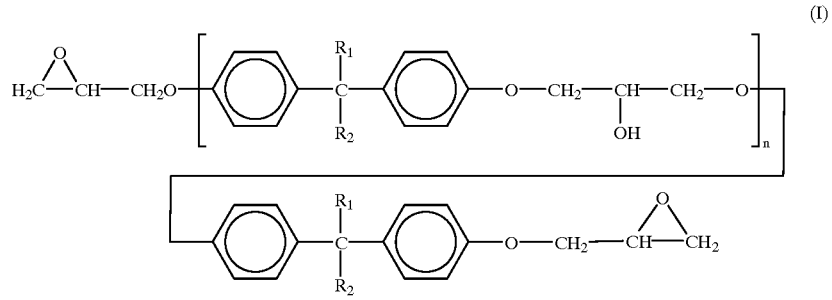

(I)

wherein $R_1$ and $R_2$, independently, are hydrogen, $C_{1-4}$alkyl, or halogenated $C_{1-4}$alkyl, and n is a number from about 2 to about 30. The epoxy resin (I) is formed from a BADGE monomer having the structural formula (II).

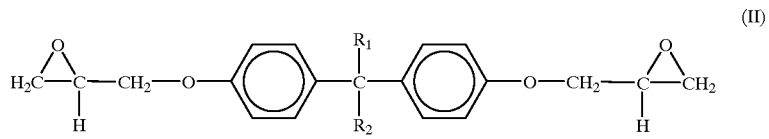

(II)

Examples of bisphenol compounds that can be reacted with epichlorohydrin to provide a BADGE monomer (II), or a similar BADGE monomer, include, but are not limited to:

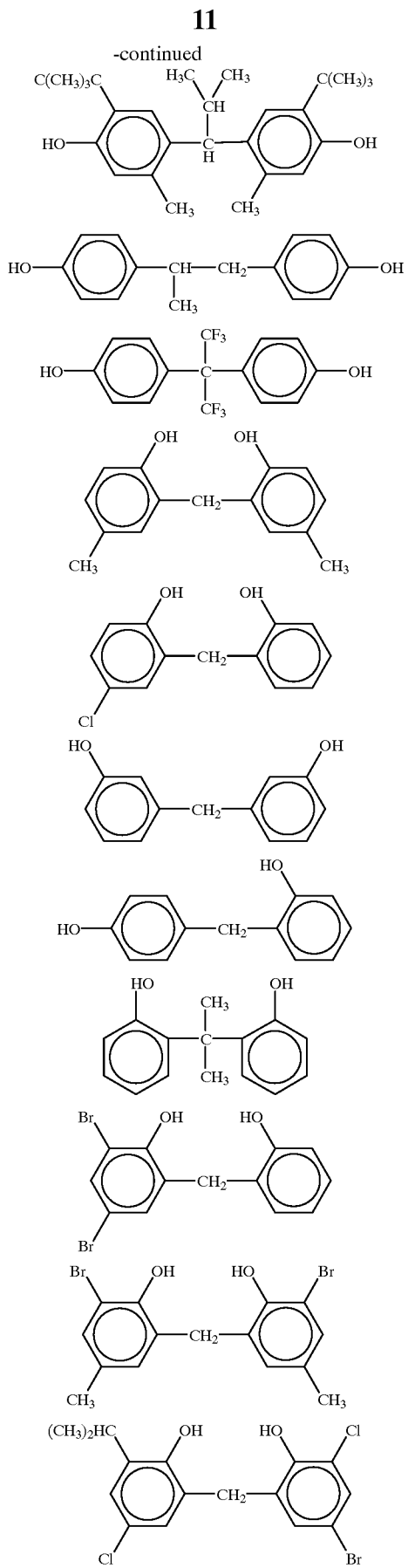
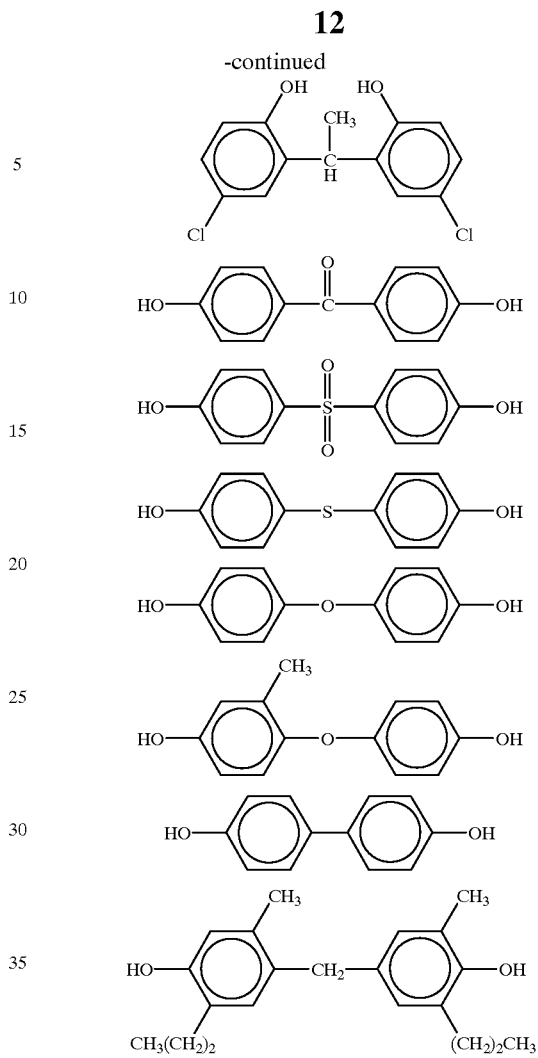

The presence of a residual BADGE monomer in the epoxy resin is undesirable because a BADGE monomer is toxic and environmentally harmful. A BADGE monomer also can be extracted from cured coatings containing an epoxy resin by liquids that contact the coating, such as a food or beverage packaged in a metal container. In response to these problems, regulatory agencies have issued regulations reducing or eliminating BADGE monomers from coatings.

The problem facing persons skilled in the art, therefore, is to eliminate BADGE monomers from coating compositions, without adversely affecting the properties of the coating composition. This has been difficult to achieve because of the important properties imparted to coating compositions by an epoxy resin. Accordingly, a simple substitution of a different type of resin for an epoxy resin eliminates the BADGE monomer problem, but does not provide the desired coating properties.

Substitution of a high molecular weight phenoxy resin for the medium molecular weight epoxy resin was unsuccessful. The high molecular weight phenoxy resin contains essentially no intact epoxy rings, and because of the high degree of reaction, contains essentially no BADGE monomers. However, high molecular weight phenoxy resins are difficult to handle, are expensive, arid did not perform as well as medium molecular weight epoxy resins.

Therefore, in order to overcome the problem of residual BADGE monomers without adversely affecting the properties of a solid coating composition, the end-capped epoxy resins of the present invention were incorporated into the

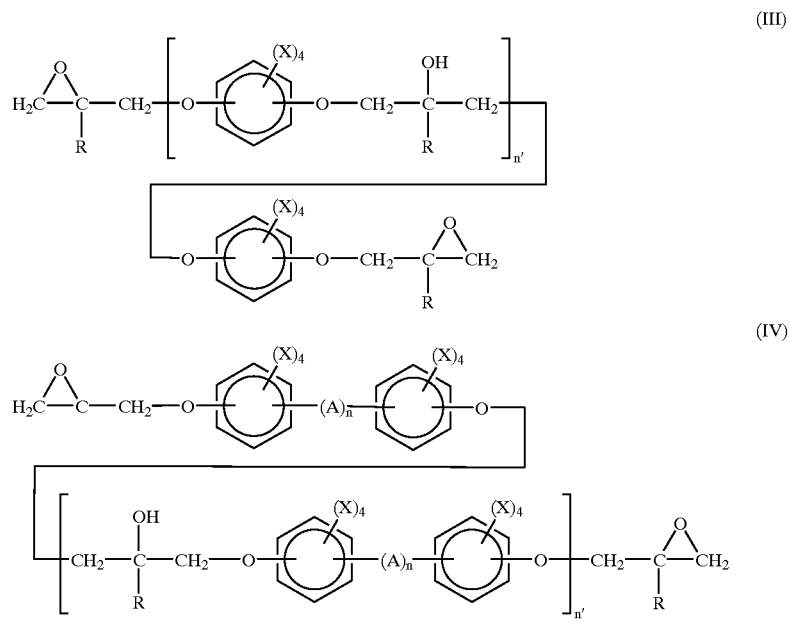

solid coating composition. The end-capped epoxy resins are low-to-medium molecular resins having an $M_w$ of about 300 to about 10,000, and preferably about 600 to about 8,000. To achieve the full advantage of the present invention, the end-capped epoxy resin has an $M_w$ of about 1,000 to about 8,000.

Within the above $M_w$ range for the end-capped epoxy resin, the applied coating composition is sufficiently flexible to permit deformation of an applied coating composition without forming cracks, and is sufficiently hard to exhibit excellent chemical and mar resistance.

The end-capped epoxy resin does not substantially react with the base polymer during manufacture of the solid coating composition or during the application process. Accordingly, after application to a metal substrate, the solid coating composition is not subjected to a curing step. The end-capped epoxy resin improves the barrier properties of the applied coating and the adhesion of the applied coating composition to the metal substrate.

The end-capped epoxy resin of the present invention is a reaction product between an epoxy resin and a compound having an active hydrogen atom and that is capable of opening an epoxy ring. A typical epoxy resin used in the preparation of an end-capped epoxy resin has the structure of formula (I), wherein n is a number from about 2 to about 10. Preferred epoxy resins contain an average of about 1.5 to about 2.5 epoxy groups per molecule of epoxy resin, but epoxy novolac resins containing greater than about 2.5 epoxy groups per molecule also can be used, i.e., containing about 2.5 epoxy groups to about 6 epoxy groups.

The epoxy resin typically is an aromatic resin, like epoxy resins based on the diglycidyl ether of bisphenol A or bisphenol F. Exemplary epoxy resins include, but are not limited to, EPON 828, EPON 1004, EPON 1007, and EPON 1009, all available from Shell Chemical Co., Houston, Tex., or ARALDITE® 6099, available from CIBA-GPIGY Corp., Ardsley, N.Y.

In general, suitable epoxy resins are, for example, epoxy resins represented by structural formulae III and IV:

wherein each A is, independently, a divalent hydrocarbyl group having 1 to about 12, preferably 1 to about 6, and most preferably 1 to about 4, carbon atoms; each R is, independently, hydrogen or an alkyl group having 1 to about 3 carbon atoms; each X is, independently, hydrogen, a hydrocarbyl or hydrocarbyloxy group having 1 to about 12, preferaable 1 to about 6, and most preferably 1 to about 4, carbon atoms, or a halogen atom, preferably chlorine or bromine; n is 0 or 1, and n' has an average value of about 2 to about 10, and preferably 5 to about 10.

The epoxy resin is reacted with a compound having an active hydrogen atom and that is capable of opening an epoxy ring. Classes of such compounds include alcohols, phenols, carboxylic acids, secondary amines, mercaptans, and oxo-acids of phosphorus, like phosphoric acid, phosphorous acid, and phosphonic acid.

Suitable alcohols and mercaptans include monoprotic $C_1$–$C_8$ alcohols and mercaptans, especially $C_2$–$C_6$ alcohols and mercaptans, either straight-chained or branched. Suitable phenols, and thiophenols, include all phenols having one active hydrogen. The alcohols and phenols can be substituted with various substituents, like alkyl groups and halogens, that do not react with an epoxy ring in a ring opening reaction. Compounds having more than one active hydrogen atom are avoided because such compounds can enter into crosslinking reactions.

The carboxylic acid can be an aliphatic or an aromatic carboxylic acid. The aliphatic carboxylic acids contain 1 to about 10 carbon atoms, and preferably 2 to about 8 carbon atoms. The aromatic carboxylic acids include benzoic acid and similar aromatic monocarboxylic acids. The carboxylic acids can be substituted with substituents that do not react with an epoxy ring in a ring opening reaction. The acids and substituents therein can be straight-chained or branched. Carboxylic acids like phenylacetic acid and substituted phenylacetic acid also are useful in the present invention.

Secondary amines having the formula $R_1R_2NH$ also can be used to end-cap the epoxy resin. The $R_1$ and $R_2$ groups, independently, are an alkyl or hydroxyalkyl group containing 1 to 6 carbon atoms, or are aryl groups, like phenyl. The alkyl, hydroxyalkyl, and aryl groups can be substituted with substituents that do not react with an epoxy ring in a ring opening reaction.

Phosphorus oxo-acids, like phosphoric acid, phosphorous acid, and phosphonic acid, also can be used to end-cap the epoxy resin. Esters of phosphorus oxo-acids similarly can be used to end-cap the epoxy resin, provided the ester has at least one active hydrogen atom.

The epoxy resin is reacted with a sufficient amount of a compound having an active hydrogen atom to end-cap all the epoxy groups of the resin. Accordingly, a slight excess, in equivalents, of the compound having an active hydrogen atom preferably is used in the reaction. As set forth in the following examples, a wide variety of compounds can be used to open the epoxy groups and provide an end-capped epoxy resin.

EXAMPLE 1

Benzoic Acid End-Capped Epoxy Resin

EPON 1009 (4 77.3 g), an epoxy resin having an EEW of about 2300 to about 3800, was charged into a flask with 22.2 g benzoic acid and 0.45 g of N,N-dimethyl benzyl amine catalyst. The reaction mixture was reacted under a nitrogen ($N_2$) atmosphere at reflux (350° F.) until the EFW of the reaction product was 117,000. At this EEW, essentially all the epoxy groups of the resin were end-capped with benzoic acid. The reaction was repeated at 300° F. In addition, benzoic acid was used to end-cap EPON 1007, an epoxy resin having an EEW of about 1700 to about 2300.

The benzoic acid end-capped resins were analyzed for intact epoxy groups and for side reactions, like esterification reactions at the secondary hydroxyl groups of the end-capped resin. NMR analysis showed that no intact epoxy groups were present and no esterification of the secondary hydroxyl groups occurred.

The benzoic acid end-capped resins also were assayed for residual bisphenol A and BADGE monomer by using a reverse phase HPLC and fluorescence detection. The chromatograph was gradient programmed from 30:70 THF/water isocratic for 6 minutes to 100 percent THF at 30 minutes. A Jones Chromatography Nucleosil ODS 5 $\mu$m column 4.6 mm×250 mm was used for the separation. The fluorescence detector was set at 274 nm excitation and 300 nm emission. The detector was set at range 500, lamp flash rate 100, and PMT voltage 600.

The benzoic acid end-capped EPON 1007 contained 0.047% bisphenol-A and 0.022% BADGE, by weight. The benzoic acid end-capped EPON 1009 contained 0.138% bisphenol-A and 0.054% BADGE, by weight. The percentages are the average to two replicate assays.

The starting epoxy resins, i.e., EPON 1007 and EPON 1009, typically contain about 0.5% by weight BADGE monomer. Accordingly, end-capping the epoxy resin with benzoic acid reduced the amount of BADGE by factors of about 22 and about 9, respectively.

In an alternative embodiment, an epoxy resin can be advanced to increase the molecular weight of the epoxy resin to a predetermined level, followed by end-capping with benzoic acid or another suitable end-capping compound. For example, EPON 828 (EEW about 185) can be reacted with bisphenol-A to provide an epoxy resin having an EEW of about 3500, followed by end-capping with benzoic acid. The low molecular weight EPON 828 also can be end-capped directly.

EXAMPLE 2

Diethanolamine End-Capped Epoxy Resin

EPON 1009 (1000 g) was charged into a flask and heated under an $N_2$ blanket. Diethanolamine (44.3 g) was added to flask, and the reaction was performed at about 325° F. until all the epoxy groups were consumed. The reaction product was assayed for BADGE. The amount of BADGE in the diethanolamine end-capped epoxy resin was below the detectable limit of 10 ppm (parts per million).

In another example, EPON 1009 was end-capped with diphenylamine to provide a reaction product containing 0.002 BADGE monomer. A reaction between EPON 1009 and diisopropanolamine provided an end-capped resin containing essentially no intact epoxy groups, i.e., is essentially BADGE free. A reaction between EPON 1009 and octanoic acid provided an end-capped epoxy resin having a BADGE concentration of about 30 ppm, without any evidence of side reactions. Similar results are observed in a reaction between EPON 1007 and phenol.

The above examples show that the end-capped epoxy resins are essentially free of BADGE monomer, i.e., contain 0% to a maximum of 0.025% BADGE, by weight. The typical BADGE content is 0% to about 0.0025%, by weight. Based on the amount of the end-capped epoxy resin that is present in a solid coating composition of the present invention, a solid coating composition of the present invention contains 0% to 0.0075% BADGE monomer, by weight. This amount of BADGE is well below regulatory limits and overcomes the environmental and toxicological problems associated with BADGE. As illustrated hereafter, the elimination of BADGE in accordance with the present invention provides a solid coating composition having coating properties equal to compositions containing an epoxy resin.

(c) Optional Inorganic Filler

A solid coating composition of the present invention also can include 0% to about 25%, and preferably 0% to about 20%, by total weight of the composition, of an inorganic filler. An inorganic filler is included to improve the physical properties ties of an applied coating composition.

Exemplary inorganic fillers used in the coating composition of the present invention include, but are not limited to, clay, mica, aluminum silicate, fumed silica, magnesium oxide, zinc oxide, barium oxide, calcium sulfate, calcium oxide, aluminum oxide, magnesium aluminum oxide, zinc aluminum oxide, magnesium titanium oxide, iron titanium oxide, calcium titanium oxide, and mixtures thereof. The inorganic filler is essentially nonreactive and is incorporated into the extrusion coating composition in the form of a powder, generally about 10 to 200 microns in diameter, and in particular, about 50 microns to about 125 microns in diameter.

(d) Optional Flow Control Agent

A solid coating composition of the present invention also can contain a flow control agent to assist in achieving a uniform film of applied coating composition on the metal substrate. The flow control agent is present in an amount of 0% to about 6%, and preferably 0% to about 5%, by total weight of the composition.

An exemplary, but nonlimiting, flow control agent is a polyacrylate available from Henkel Corporation, as PERENOL F 30 P. Another useful polyacrylate flow control agent is ACRYLON MFP. Numerous other compounds and other acrylic resins known to persons skilled in the art also can be used as a flow control agent.

(e) Other Optional Ingredients

A solid coating composition of the present invention also can include other optional ingredients that do not adversely affect the solid coating composition or an applied coating composition resulting therefrom. Such optional ingredients are known in the art, and are included in a solid coating composition to enhance composition esthetics, to facilitate manufacturing and application of the solid coating composition, and to further improve a particular functional property of a solid coating composition or an applied coating composition resulting therefrom.

Such optional ingredients include, for example, dyes, pigments, anticorrosion agents, antioxidants, adhesion promoters, light stabilizers, and mixtures thereof. Each optional ingredient is included in a sufficient amount to serve its intended purpose, but not in such an amount to adversely affect a solid coating composition or an applied coating composition resulting therefrom.

For example, a pigment, in an amount of 0% to about 50% by weight of the composition, is a common optional ingredient. A typical pigment is titanium dioxide, barium sulfate, carbon black, or an iron oxide. In addition, an organic dye or pigment can be incorporated in the solid coating composition.

In addition, an additional polymer can be added to the solid coating composition to improve the properties of the applied coating composition. The additional polymer preferably is compatible with the other composition components and does not adversely affect the applied coating composition. To achieve a coated metal substrate having a nongloss finish, the additional polymer can be substantially incompatible with the base polymer and end-capped epoxy resin. The additional polymer can be a thermoplastic or a thermoset polymer, and is present in a solid coating composition in an amount of 0% to about 50%, and preferably 0% to about 20%, by total weight of the composition.

Nonlimiting examples of additional polymers that can be incorporated into the solid coating composition are a carboxylated polyester, a carboxylated polyolefin, a polyamide, a fluorocarbon resin, a polycarbonate, a styrene resin, an ABS (acrylonitrile-butadiene-styrene) resin, a chlorinated polyether, a urethane resin, and similar resins. Polyamide resins include nylon 66, nylon 6, nylon 610, and nylon 11, for example. A useful polyolefin is polyvinyl chloride, including homopolymwers and copolymers, for example, with ethylene or vinyl acetate, for example. Fluorocarbon resins include tetrafluorinated polyethylene, trifluorinated monochorinated polyethylene, hexafluorinated ethylenepropylene resin, polyvinyl fluoride, and polyvinylidene fluoride, for example.

A solid coating composition of the present invention can be prepared by methods well known in the art, such as by individually heating the base polymer and end-capped epoxy resin to a sufficient temperature to melt each ingredient, then admixing the molten base polymer and end-capped epoxy resin, such as in a single screw or double screw extruder, to provide a uniform solid coating composition. Optional ingredients can be added to the solid coating composition either by incorporation into one of the molten ingredients prior to admixture of the molten ingredients, or can be added to the molten solid coating composition after ingredients have been admixed. If an optional additional polymer is present in the composition, the additional polymer is melted and added to the molten solid coating composition at any convenient step of the manufacturing process. Alternatively, all composition ingredients can be admixed in the solid state, followed by melting the resulting admixture and extrusion, to provide a uniform molten composition.

After a uniform molten composition is prepared, the solid coating composition is allowed to cool and solidify. The resulting solid coating composition then can be formed into pellets having a particle diameter of about 1 to about 10 mm for use in extrusion coating applications. Alternatively, the solid coating composition is formed into a powder having a particle size of about 80 to about 100 microns for use in powder coating applications. The pellets or powder are stored and kept dry until use in an extrusion or powder coating process. Preferably, the pellets or powder are subjected to a heating step prior to extrusion or powder coating in order to expel any water absorbed by the solid coating composition during storage.

To demonstrate the usefulness of a solid coating composition of the present invention, the following examples were prepared, then extruded or powder coated onto a metal substrate to provide a coated metal substrate. The coated metal substrates then were tested for use as a food or beverage container. The applied coatings were tested for an ability to inhibit corrosion of a metal substrate, for adhesion to the metal substrate, for chemical resistance, for flexibility, and for scratch and mar resistance. The following examples illustrate some important features and embodiments of a solid coating composition of the present invention, and illustrate methods of extruding and powder coating a solid coating composition of the present invention.

In the following examples, Examples 3 and 6–10 are comparative examples. Examples 4 and 5 are solid coating compositions of the present invention. Example 3 is a standard, commercial powder coating. Examples 6–10 illustrate attempts to prepare a solid coating composition that is essentially free of BADGE monomer, but did not provide useful coating compositions for metal substrates.

TABLE 1

| Ingredient[1] | Ex. 3 | Ex. 4 | Ex. 5 | Ex. 6 | Ex. 7 | Ex. 8 | Ex. 9 | Ex. 10 |
|---|---|---|---|---|---|---|---|---|
| DYNAPOL P1500[2] | 36 | 36 |  | 36 | 36.5 | 36 | 36 | 36 |
| DYNAPOL P1510[3] | 36 | 36 | 21.5 | 36 | 36.5 | 36 | 36 | 36 |
| GRILESTA V79/20[4] |  |  | 43 |  |  |  |  |  |
| ARALDITE GT 6099[5] | 7.5 |  |  |  |  | 6 | 6 | 6 |
| END-CAPPED EPOXY RESIN[6] |  | 7.5 | 15 |  |  |  |  |  |
| PHENOXY PKHH[7] |  |  |  | 7.5 | 2.5 |  |  |  |
| Glutaric Acid |  |  |  |  |  | 1.5 | 1.5 | .75 |
| Benzoic Acid |  |  |  |  |  |  |  | .75 |
| DYNAPOL S1690[8] |  |  |  |  | 4 |  |  |  |
| Titanium dioxide[10] | 8 | 8 | 8 | 8 | 8 | 8 | 8 | 8 |
| BLANCFIX N[9] | 5 | 5 | 5 | 5 | 5 | 5 | 5 | 5 |

TABLE 1-continued

| Ingredient[1] | Ex. 3 | Ex. 4 | Ex. 5 | Ex. 6 | Ex. 7 | Ex. 8 | Ex. 9 | Ex. 10 |
|---|---|---|---|---|---|---|---|---|
| Aluminum Silicate[10] | 4 | 4 | 4 | 4 | 4 | 4 | 4 | 4 |
| Mica[10] | 3 | 3 | 3 | 3 | 3 | 3 | 3 | 3 |
| PERENOL F30P[11] | 0.5 | 0.5 | 0.5 | 0.5 | 0.5 | 0.5 | 0.5 | 0.5 |

[1] ingredients are expressed in percent by weight of the composition;
[2] DYNAPOL P1500 is a commercial polyester available from Hüls AG, having a softening point of 170–176° C., a Tg of about 23° C., and a melt viscosity of about 70–80 Pa.s at 240° C.;
[3] DYNAPOL 1510 is a commercial polyester available from Huls AG, having a melting point of 147–154° C., a Tg of about 23° C., a melt viscosity of 35–40 Pa.s at 240° C., and a melt index of about 120 g/10 min at 200° C.;
[4] GRILESTRA V 79/20 is a commercial polyester available from EMS, having a density of 1.29 g/cm$^3$, a melting point of about 15° C., a Tg of about 25° C., and a melt viscosity of about 200 Pa.s at 200° C.;
[5] ARALDITE ® 6099 is a commercial epoxy resin available from CIBA-GEIGY having an EEW of about 2500 to about 4000;
[6] the end-capped epoxy resin is EPON 1009 end-capped with benzoic acid, i.e., the benzoic acid end-capped epoxy resin of Example 1;
[7] PHENOXY PKHH is a commercial phenoxy resin available from Phenoxy Associates, having an M$_w$ of about 14,000 to about 16,000 and an EEW >100,000;
[8] DYNAPOL S1690 is a commercial polyester available from Hüls AG, having a melting point of 130° C., and a Tg of about 40° C.;
[9] BLANCFIXE N is barium sulfate;
[10] Mica, titanium dioxide, and aluminum silicate are fillers and pigments; and
[11] PERENOL F30P is a flow control agent available from Henkel Corporation.

The compostions of Examples 3–10 were prepared by admixing and melting the resin components, then adding components like titanium dioxide, aluminum silicate, the lubricant, and the flow control agent, with stirring, to the molten resin components. The resulting mixture was heated to maintain the resin components in the molten state. Then, the mixture passed through a twin blade extruder. The resulting compositions of Examples 3–10 were allowed to cool to room temperature and solidify. The compositions then were formed into a powder, the majority having a particle diameter of about 80 to 100 μ (microns).

The compositions of Example 3–10 were extruded onto a metal substrate to provide a coated metal substrate having an adherent barrier layer of an applied composition. Typically, the compositions are applied to a sheet or coil of a metal substrate moving relative to an extruder which applies the composition to the metal substrate. The extruder comprises a screw to transfer the molten composition, and a die to apply the composition to the metal substrate at a predetermined thickness. In the tests described hereafter, the extruder applied the composition to an aluminum substrate as a layer of about 80 to about 100 μ thick. In practical use, a solid coating composition of the present invention is extruded onto a metal substrate as a layer of about 1 to about 40, and preferably about 2 to about 30, microns. To achieve the full advantage of the present invention, a solid coating composition is extruded at a thickness of about 1 to about 10 microns thick. In powder coating applications, a solid coating composition is applied to the substrate as a layer having a thickness of about 1 to about 200 μ, and preferably about 10 to about 150 μ. To achieve the full advantage of the present invention, a solid coating composition is powder coated at a thickness of about 40 to about 100 μ.

The coated metal substrates then were tested for use as the interior surface of a food or beverage container. As will be demonstrated more fully hereafter, an applied coating composition resulting from extruding a solid coating composition of the present invention is suitable as the interior coating of a metal container for food or beverages or for other coated articles, like aluminum siding. An applied coating composition resulting from powder coating a solid coating composition of the present invention is suitable for beam protection and drum coatings. A present solid coating composition provided excellent applied coatings in the absence of a curing step.

A solid coating composition of the present invention can be applied to essentially any metal substrate. Nonlimiting examples of metal substrates are aluminum, tin-free steel, tinplate, steel, zinc-plated steel, zinc alloy-plated steel, lead-plated steel, lead alloy-plated steel, aluminum-plated steel, aluminum alloy-plated steel, and stainless steel.

In an extrusion coating method, a solid coating composition is slowly and carefully melted by first heating the composition at about 100° C. to about 120° C., then slowly increasing the temperature to about 180° C. to about 240° C. to completely melt the solid coating composition. The upper temperature is not especially limited, but must be sufficiently high to melt the composition. The composition should not be heated to a temperature far above the melting point (i.e., greater than about 100° C. above the melting point) in order to avoid undesirable reactions or degradation of the resins.

In addition, the metal is heated prior to extrusion to a temperature of about 120° C. to about 250° C. Preheating of the metal substrate is important to achieve sufficient flow of the extrusion coating composition on the metal substrate, and to achieve adhesion of the extruded composition to the metal substrate.

In a powder coating method, a solid coating composition is electrostatically charged by Corona or Tribo and is sprayed onto the metal substrate. The coating film builds up over 10 minutes at 200° C., or over 5 seconds at 300° C., peak metal temperature.

A solid coating composition does not cure or crosslink to any substantial extent during, or after, application onto a metal substrate. Therefore, a step of curing the solid composition at an elevated temperature is omitted. However, to optimize the properties of the solid composition, the coated metal substrate, after cooling, preferentially is subjected to a post-application heating step conducted at about 250° C. to about 550° C. for about 5 to about 30 seconds, and preferably about 300° C. to about 500° C. for about 10 to about 20 seconds.

The resulting applied coating compositions had a smooth, glossy appearance, and were defect free. The present solid coating compositions provide a highly protective, selflubricating layer when applied onto a metal substrate. The applied coatings had good adhesion, exhibited good barrier and anticorrosion properties, and were essentially free of BADGE monomer. Overall, the solid coating compositions of the present invention performed at least equally to prior epoxy resin-containing compositions, and have the additional advantage of being essentially free of BADGE monomer.

Overall, a solid coating composition of the present invention demonstrates the advantages of eliminating chemical pretreatment of the metal substrate; substituting the use of a small induction oven for preheating the metal substrate and for ?0 postheating in place of a large convection oven for drying a liquid composition; using a solid composition containing no organic compounds in place of a liquid containing organic solvents; using a solid composition that is essentially free of BADGE monomer, and eliminates the toxicity and environmental problems associated with BADGE; eliminating lubricating stations; and eliminating solvent incinerators.

Aluminum panels coated with the compositions of Examples 3–10 were subjected to various tests. The tests are well known to persons skilled in the art and are summarized as follows:

Adhesion and Blush

The blush resistance test demonstrates the ability of an applied coating to resist attack by various solutions. Adhesion is tested by the crosshatch adhesion test wherein razor blades make perpendicular crosshatch patterns in an applied coating. Adhesive tape is applied to the crosshatch patterns, then the adhesive tape is removed at a 90° angle in a fast movement. The amount of applied coating remaining as the metal substrate then is determined. The applied coating were rated for adhesion according to the following system:

0—perfect
1—very slight pickoff from edges of squares
2—slight pickoff (1–2%)
3—moderate pickoff (2–50%)
4—severe pickoff (>50%)
5—very severe, crosshatching removes the coating.

The samples were rated for blushing as follows:
0—perfect
1—very slight haze on surface
2—slight cloudy appearance
3—moderate cloudy appearance
4—very cloudy and dull appearance, possible discoloration.

Sterilization Tests

These tests are performed t o determine how well the applied coating withstands processing conditions for different Aypes of foods packaged in metal containers.

| | Processing Test Solutions |
|---|---|
| Solution A | Demineralized water |
| Solution B [12] | 40 g concentrated acetic acid |
| | 24 g gelatin |
| | 24 g sodium chloride |
| | 0.4 g crystalline sodium sulfide ($Na_2S.9\ H_2O$) |
| Solution C [12] | 16 g citric acid crystals |
| | 3.2 g vitamin C (ascorbic acid) |
| | q.s. water to about 800 ml |
| Solution D [12] | 16 g citric acid crystals |
| | 0.2 g $H_2O_2$ hydrogen peroxide (30% sol.) |
| | 0.8 g $NH_4NO_3$ ammonium nitrate |
| | q.s. water to about 800 ml |

[12] The test solutions A, B, C, D have been chosen for cans containing a wide variety of food fillings; these tests are conducted for 1 hour at 121° C.

Wedge Bend Test

This test is performed using an Is 1125 instrument available from Gardner (USA). A coated substrate is prefolded and held on the anvil of the instrument. A weight of four pounds is dropped from a height of 25 inches onto a metal block that is suspended on one side. The loose side of the block deforms the metal substrate in a conical shape at a force of 100 in/lb. The coating on the exterior side of the metal substrate is examined for cracks. The percent of 100 mm conical length that does not show porosity after the deformation is the reported Wedge Bend flexibility value.

Reverse Impact Test

This test is performed using an IG 1125 available from Gardner (USA). A coated metal substrate is held on the reverse side on a metal block having a hole. A four-pound weight with a metal ball is given from predetermined heights onto the surface of the metal substrate that is not coated. The coated surface of the substrate is examined for cracks. The reverse impact values are determined as the maximum height (in inches) time the maximum weight (in pounds) dropped onto the metal substrate before the coating suffers cracks. Typically, the weight is held constant at four pounds, and the height is varied.

Test results for aluminum panels coated with the compositions of Examples 3–10 are summarized below. These tests were performed on panels coated with about 80 to about 100 $\mu$ of a composition of Examples 3–10. Each coated aluminum panel then was heated at 280° C. for 40 seconds.

TABLE 2

| | Adhesion Prior to | Sterilization Test | | | |
|---|---|---|---|---|---|
| Example | Sterilization Test | A | B | C | D |
| 3 | 0 | 0 | 0–1 | 0 | 0 |
| 4 | 0 | 0 | 0–1 | 0 | 0 |
| 5 | 0 | 0 | 3 | 0 | 0 |
| 6 | 0 | 0 | 0 | 0 | 0 |
| 7 | 0 | 0 | 0 | 0 | 0 |
| 8 | 0 | 3 | 3 | 0–1 | 2–3 |
| 9 | 0 | 0 | 0–1 | 0–1 | 0 |
| 10 | 0 | 1 | 1–2 | 1–2 | 0–1 |

Solid compositions of the present invention (i.e., Examples 4 and 5) passed the adhesion test. Compositions of Examples 6–10 also passed the adhesion test, but exhibited other disadvantages. examples passed the blush test, with no noticeable difference observed in appearance after the sterilization tests compared to appearance prior to the sterilization test.

Examples 6 and 7 contained a high molecular weight phenoxy resin as opposed to an end-capped epoxy resin. Examples 6 and 7 were difficult to prepare and prohibitively expensive for commercial use. Examples 8–10 contained an epoxy resin and an organic acid in an attempt to provide an end-capped epoxy resin in situ and thereby reduce BADGE monomer The residual BADGE monomer concentration. was not reduced sufficiently to meet existing regulatory standards.

The aluminum panels coated with the compositions of Examples 4–10 were compared to an aluminum panel coated with the composition of Example 3, i.e., a present day solid composition containing an epoxy resin. The compositions of Examples 4–10 compared favorably to the composition of Example 3, before and after the sterilization tests, for adhesion and blush, and in wedge bend and reverse impact tests. The reverse impact and wedge bend tests showed that a solid composition of the present invention has sufficient flexibility and adhesion to a metal substrate to perform as a coating for a food or beverage container.

Overall, the data summarized in Table 2 shows that a present solid coating composition performs as well as existing compositions that contain an epoxy resin, and have the added advantage of containing essentially no BADGE monomer. The adhesion test is important with respect to the present coating compositions because the epoxy resin is present in existing compositions to promote adhesion of the composition to a metal substrate. The end-capped epoxy resins have been shown to sufficiently promote adhesion, and thereby can provide a useful coating for a food or beverage container.

The flexibility of a solid coating composition is illustrated in the data of Table 3, which summarizes the results of wedge bend tests for aluminum panels coated with the compositions of Examples 3–10.

TABLE 3

| Example | Coating Thickness ($\mu$) | Wedge Bend Results |
|---|---|---|
| 3 | 80–100 | 75/81 |
| 4 | 70–100 | 100/100 [13] |
| 5 | 65–90 | 100/100 |
| 6 | 65–135 | 70/71 |
| 7 | 80–100 | 100/100 |
| 8 | 100–115 | 100/100 [13] |
| 9 | 70–105 | 95/95 |
| 10 | 100–180 | 100/100 [13] |

[13] isolated pores were observed.

The present solid coating compositions, i.e., Examples 4 and 5, passed 100 out of 100 tests and showed no isolated pores. A present day coating composition, i.e., Example 3, passed 75 out of 81 tests, but had isolated pores. A present solid coating composition, therefore, has excellent flexibility for use as a coating for a metal substrate.

The compositions of Examples 3–10 also were subjected to a reverse impact test on aluminum panels. All compositions passed the reverse impact test. A solid coating composition of the present invention, therefore, is suitable for use as a coating on a metal substrate.

Aluminum panels coated with the compositions of Examples 3–10 also were assayed for the amount of BADGE monomer, bisphenol A monomer, and the first and second hydrolysis products of BADGE present in the coating. The structures of these compounds are set forth below:

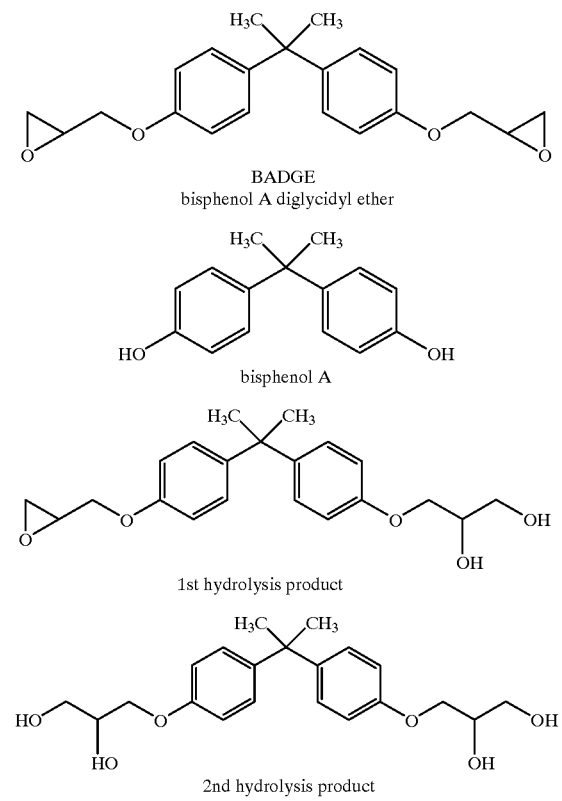

BADGE
bisphenol A diglycidyl ether bisphenol A

1st hydrolysis product

2nd hydrolysis product

Twenty-five samples were tested, and the assay results are summarized in Table 4. No secondary hydrolysis drolysis product of BADGE monomer was detected in any of the twenty-five sample.

TABLE 4

| Test No. | Composition | Post-Heating Conditions | Coating Thickness ($\mu$) | BADGE[14] | First Hydrolysis Product[14] | Bisphenol A[10] |
|---|---|---|---|---|---|---|
| 1 | Ex. 11[15] | 40 sec/250° C. | 80–90 | 0.66 | 0.29 | <0.01 |
| 2 | Ex. 11 | 40 sec/280° C. | 80–90 | 0.16 | 0.12 | <0.01 |
| 3 | Ex. 3 | 40 sec/250° C. | 80–90 | 0.17 | 0.06 | <0.01 |
| 4 | Ex. 3 | 40 sec/280° C. | 85–95 | 0.15 | 0.05 | <0.01 |
| 5 | Ex. 4 | no heating | 70–100 | 0.09 | 0.04 | 0.11 |
| 6 | Ex. 4 | 40 sec/250° C. | 70–100 | 0.08 | 0.03 | 0.10 |
| 7 | Ex. 4 | 40 sec/280° C. | 70–100 | 0.05 | 0.02 | 0.06 |
| 8 | Ex. 5 | no heating | 70–90 | <0.01 | <0.01 | 0.22 |
| 9 | Ex. 5 | 40 sec/250° C. | 70–90 | <0.01 | <0.01 | 0.21 |
| 10 | Ex. 5 | 40 sec/280° C. | 70–90 | <0.01 | <0.01 | 0.16 |
| 11 | Ex. 6 | no heating | 70–135 | 0.10 | 0.04 | 0.17 |
| 12 | Ex. 6 | 40 sec/250° C. | 70–135 | 0.08 | 0.03 | 0.15 |
| 13 | Ex. 6 | 40 sec/280° C. | 70–135 | 0.08 | 0.03 | 0.15 |
| 14 | Ex. 7 | no heating | 80–100 | 0.09 | 0.03 | 0.05 |
| 15 | Ex. 7 | 40 sec/250° C. | 80–100 | 0.08 | 0.03 | 0.05 |
| 16 | Ex. 7 | 40 sec/280° C. | 80–100 | 0.05 | 0.02 | 0.04 |
| 17 | Ex. 8 | no heating | 100–115 | 0.41 | 0.18 | 0.02 |
| 18 | Ex. 8 | 40 sec/250° C. | 100–115 | 0.33 | 0.14 | 0.02 |
| 19 | Ex. 8 | 40 sec/280° C. | 100–115 | 0.25 | 0.12 | 0.02 |
| 20 | Ex. 9 | no heating | 70–105 | 0.26 | 0.11 | 0.01 |
| 21 | Ex. 9 | 40 sec/250° C. | 70–105 | 0.22 | 0.09 | 0.01 |
| 22 | Ex. 9 | 40 sec/280° C. | 70–105 | 0.21 | 0.09 | 0.01 |
| 23 | Ex. 10 | no heating | 100–180 | 0.42 | 0.19 | 0.02 |
| 24 | Ex. 10 | 40 sec/250° C. | 100–180 | 0.42 | 0.18 | 0.02 |

TABLE 4-continued

| Test No. | Composition | Post-Heating Conditions | Coating Thickness (μ) | BADGE[14] | First Hydrolysis Product[14] | Bisphenol A[10] |
|---|---|---|---|---|---|---|
| 25 | Ex. 10 | 40 sec/280° C. | 100–180 | 0.29 | 0.12 | 0.02 |

[14] concentration expressed as mg/qdm, milligrams per 100 square centimeters;
[15] Example 11 is a commercial coating composition containing a blend of polyester powders and an epoxy/polyester hybrid powder.

The data summarized in Table 4 shows that solid coating compositions of the present invention (i.e., Ex. 4 and 5) contain less than 0.10 mg/qdm of BADGE. Example 5 contains less than 0.01 mg/qdm. These results show that a present solid coating composition overcomes the problem of residual BADGE monomer, without adversely affecting the performance of the coating, as set forth in Tables 1–3, and without seriously affecting the cost of the composition. The data shows that in situ end-capping of the epoxy resin (Examples 8–10) did not reduce the amount of BADGE monomer in the coating sufficiently. Examples 6 and 7 have a reduced BADGE content but were more difficult to apply and handle, and are prohibitively expensive. Tests 1–4 were performed on standard, epoxy resin containing solid compositions as a control, and show that the present solid coating compositions have a reduced BADGE content of at least 50%, and in Example 5 of about two orders of magnitude.

A present solid coating composition exhibited coating properties at least equal to current commercial compositions used for similar practical applications. The data summarized above illustrates that a solid coating composition of the present invention provides an applied coating composition useful on the interior or exterior coating of a food or beverage container.

In particular, a coating composition for a metal container must demonstrate excellent adhesion and flexibility because metal containers are manufactured by first coating flat sheets of the metal substrate, then forming the coated sheets into a desired shape. Coatings having poor adhesion properties can separate from the metal substrate during the shaping process. A lack of adhesion, therefore, can adversely affect the ability of the cured coating composition to inhibit corrosion of the metal substrate. A present solid coating composition exhibits an excellent adhesion to a metal substrate, and, therefore, a coating can be extruded onto a metal substrate, and the metal substrate subsequently can be deformed without adversely affecting continuity of the coating film.

The applied coating compositions have excellent flexibility. Flexibility is an important property of a polymeric coating because the metal substrate is coated prior to stamping or otherwise shaping the metal substrate into a desired metal article, such as a metal container. The coated metal substrate undergoes severe deformations during the shaping process, and if a coating lacks sufficient flexibility, the coating can form cracks or fractures. Such cracks result in corrosion of the metal substrate because the aqueous contents of the container have greater access to the metal substrate. Metal substrates coated with a present solid coating composition were deformed into the shape of a metal can. No cracks or fractures were observed. In addition, as previously described, an applied coating provided by a solid coating composition of the present invention is sufficiently adherent to the metal substrate, and remains sufficiently adherent during processing into a metal article, and, therefore, further enhances corrosion inhibition.

The data summarized in Tables 1–4 demonstrate that a present applied coating composition maintains adhesion to the metal substrate, is flexible, is sufficiently hard, and, therefore, is scratch and mar resistant, resists blush, and resists chemical attack. Such a combination of advantages are necessary, or at least desirable, in a coating applied to the interior of food and beverage containers.

The above-described advantages make a solid coating composition of the present invention useful for application on the interior or extrusion surface of a variety of metal articles, such as for the interior of metal containers for foods and beverages. A present solid coating composition overcomes the environmental and toxicological concern associated with BADGE, monomer because the compositions contain an end-capped epoxy resin. Surprisingly, substituting an end-capped epoxy resin for a standard epoxy resin did not adversely affect the properties of a coating on a metal container. A present solid coating composition is especially useful as a coating on a metal container that holds tasto-sensitive foods or beverages, like beer, because the extruded coating composition is essentially free of components that affect the taste of the food or beverage.

Obviously, many modifications and variations of the invention as horeinbefore set forth can be made without departing from the spirit and scope thereof, and, therefore, only such limitations should be imposed as are indicated by the appended claims.

What is claimed is:

1. A solid composition comprising:
    (a) about 70% to about 95% by weight, of a base polymer having a weight average molecular weight of about 10,000 to about 200,000;
    (b) about 1% to about 50% by weight, of an end-capped epoxy resin having a weight average molecular weight of about 300 to about 10,000, wherein the end-capped epoxy resin is essentially free of a bisphenol diglycidyl ether monomer;
    (c) 0% to about 25%, by weight, of an inorganic filler; and
    (d) 0% to about 6%, by weight, of a flow control agent.

2. The composition of claim 1 wherein the base polymer is a polyester or a blend of polyesters.

3. The composition of claim 2 wherein the base polymer has a weight average molecular weight of about 10,000 to about 70,000.

4. The composition of claim 2 wherein the polyester has an acid number of 0 to about 150 mg KOH/g and a hydroxyl number of 0 to about 150 mg KOH/g.

5. The composition of claim 2 wherein the polyester has a glass transition temperature of about −30° C. to about 120° C.

6. The composition of claim 3 wherein the polyester has a melt viscosity of about 25 to about 200 Pa.s at 240° C.

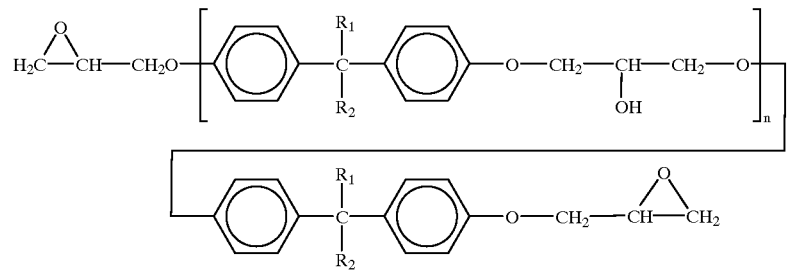

7. The composition of claim 2 wherein the polyester has a melt flow index of about 20 to about 800 g/10 min at 200° C.

8. The composition of claim 2 wherein the polyester has a softening point of about 120° C. to about 200° C.

9. The composition of claim 2 wherein the polyester comprises condensation product of (i) a dicarboxylic acid or an esterifiable derivative of a dicarboxylic acid, and (ii) an aliphatic diol, wherein at least 60 mol of the dicarboxylic acid or dicarboxylic acid derivative is an aromatic dicarboxylic acid.

10. The composition of claim 9 wherein the aromatic dicarboxylic acid is selected from the group consisting of phthalic acid, isophthalic acid, 5-tert-butyl isophthalic acid, terephthalic acid, a naphthalene dicarboxylic acid, and mixtures thereof.

11. The composition of claim 2 wherein the polyester comprises the reaction product of (i) a dicarboxylic acid or an esterifiable derivative of a dicarboxylic acid, and (ii) a low molecular weight epoxy resin having an EEW of about 150 to about 500.

12. The composition of claim 2 wherein the polyester is selected from the group consisting of a polyethylene terephthalate, a polybutylene terephthalate, a polyethylene naphthalate, a polybutylene naphthalate, a copolyester, and mixtures thereof.

13. The composition of claim 1 wherein the base polymer is selected from the group consisting of a polyolefin, a polyamide, a polyacrylic, a polycarbonate, a polyurethane, a carboxylated polyester, a fluorocarbon resin, a styrene resin, an ABS resin, a chlorinated polyether, a halogenated polyolefin, and mixtures thereof.

14. The composition of claim 13 wherein the base polymer has a weight average molecular weight of about 20,000 to about 200,000.

15. The composition of claim 1 wherein the coating composition contains about 5% to about 30%, by weight, of the end-capped epoxy resin.

16. The composition of claim 1 wherein the end-capped epoxy resin has a weight average molecular weight of about 600 to about 8,000.

17. The composition of claim 1 wherein the end-capped epoxy resin is a reaction product of (a) an epoxy resin and (b) a compound having an active hydrogen atom and that is capable of opening an epoxy ring.

18. The composition of claim 1 wherein the epoxy resin has a structure wherein $R_1$ and $R_2$, independently, are hydrogen, $C_{1-4}$alkyl, and halogenated $C_{1-4}$alkyl, and n is a number from about 2 to about 30.

19. The composition of claim 17 wherein the compound having an active hydrogen atom is selected from the group consisting of an alcohol, a phenol, a thiophenol, a carboxylic acid, a secondary amine, a mercaptan, a phosphorus oxo-acid, an ester of a phosphorus oxo-acid having at least one active hydrogen atom, and mixtures thereof.

20. The composition of claim 19 wherein the alcohol is a $C_{1-4}$–$C_8$ alcohol, the carboxylic acid is an aliphatic $C_{1-4}$–$C_{10}$ carboxylic acid or an aromatic carboxylic acid, the secondary amine has the formula $R_1R_2NH$, wherein $R_1$ and $R_3$, independently, are an alkyl or a hydroxyalkyl group containing 1 to 6 carbon atoms or an aryl group, and the phosphorus oxo-acid is selected from the group consisting of phosphoric acid, phosphorous acid, and phosphonic acid.

21. The composition of claim 17 wherein the compound having an active hydrogen atom is selected from the group consisting of benzoic acid, phenylacetic acid, diethanolamine, and diisopropylamine.

22. The composition of claim 1 wherein the end-capped epoxy resin contains 0% to about 0.025%, by weight, of a bhspheniol diglycidyl ether monomer.

23. The composition of claim 1 wherein the composition contains 0% to about 0.0075%, by weight, of a bisphenol diglycidyl ether monomer.

24. The composition of claim 1 wherein the composition is free of organic solvents.

25. The composition of claim 1 wherein the inorganic filler is selected from the group consisting of clay, mica, aluminum silicate, fumed silica, magnesium oxide, zinc oxide, barium oxide, calcium sulfate, calcium oxide, aluminum oxide, magnesium aluminum oxide, zinc aluminum oxide, magnesium titanium oxide, iron titanium oxide, calcium titanium oxide, and mixtures thereof.

26. The composition of claim 1 wherein the flow control agent comprises an acrylic resin.

27. The composition of claim 1 wherein the coating composition further comprises a pigment, an organic dye, or a mixture thereof.

* * * * *

UNITED STATES PATENT AND TRADEMARK OFFICE
CERTIFICATE OF CORRECTION

PATENT NO. : 5,994,462
DATED : November 30, 1999
INVENTOR(S) : Srinivasan et al.

It is certified that error appears in the above-identified patent and that said Letters Patent is hereby corrected as shown below:

Column 27,
Line 26, "mol of the" should be -- mol % of the --

Column 28,
Line 28, "$C_{1-4}$" both occurrences, should be -- $C_1$ --
Line 42, "bhspheniol" should be -- bisphenol --

Signed and Sealed this

Nineteenth Day of March, 2002

*Attest:*

JAMES E. ROGAN
*Director of the United States Patent and Trademark Office*

*Attesting Officer*